United States Patent [19]
Elverum, Jr.

[11] 4,206,594
[45] * Jun. 10, 1980

[54] COMBUSTION APPARATUS HAVING A COAXIAL-PINTLE REACTANT INJECTOR

[75] Inventor: Gerard W. Elverum, Jr., Los Angeles, Calif.

[73] Assignee: TRW Inc., Redondo Beach, Calif.

[*] Notice: The portion of the term of this patent subsequent to Oct. 24, 1989, has been disclaimed.

[21] Appl. No.: 194,348

[22] Filed: Nov. 1, 1971

Related U.S. Application Data

[63] Continuation-in-part of Ser. No. 696,470, Jan. 8, 1968, Pat. No. 3,699,772.

[51] Int. Cl.² .......................... F23D 11/38; B05B 7/08
[52] U.S. Cl. ..................................... 60/258; 239/425; 239/426
[58] Field of Search ........................... 60/258, 39.74 A; 239/42.45, 425, 426, 548, 556, 560, 561

[56] References Cited
U.S. PATENT DOCUMENTS

| 3,093,157 | 6/1963 | Aitken | 60/258 |
| 3,421,700 | 1/1969 | Seamans | 60/39.74 A |
| 3,462,950 | 8/1969 | Chevalaz | 60/39.74 A |

Primary Examiner—Douglas Hart

[57] ABSTRACT

To provide combustion stability in burners over a wide range of flow conditions, a coaxial injector is provided which includes an outer annular sleeve for introduction of one reactant and a hollow pintle with spaced slots for introduction of another reactant to impinge on the first reactant. The slots are staggered in location and size to permit initial interlocking of the reactants and, therefore, increased mixing and improved combustion performance.

3 Claims, 3 Drawing Figures

COMBUSTION APPARATUS HAVING A COAXIAL-PINTLE REACTANT INJECTOR

The invention described herein was made in the performance of work under a NASA contract and is subject to the provisions of Section 305 of the National Aeronautics and Space Act of 1958, Public Law 85-568 (72 Stat. 435; 42 U.S.C. 2457).

CROSS REFERENCE TO RELATED APPLICATIONS

This application is a continuation-in-part of application Ser. No. 696,470 filed Jan. 8, 1968, now U.S. Pat. No. 3,699,772, issued Oct. 24, 1972.

BACKGROUND OF THE INVENTION

This invention pertains to combustors and more particularly to a simple injector concept for interlocking two or more reactants to provide increased combustion efficiency and to provide a fundamental mechanism for achieving dynamically stable combustion in a wide range of combustor sizes.

One of the greatest problems in reactors such as rocket engines or industrial burners when two reactants are introduced through an injector for mixing, is that of achieving combustion stability. This problem of maintaining combustion stability has been present or can be initiated in nearly all combustors, and particularly as the size of the combustor is inccreased. By using an injector concept in which all of the reactant is introduced into the chamber from the center region of the head end closure plate, the combustion process can be made dynamically stable in all engine sizes. This results from the energy source being located at the nodal point of the acoustic pressure field. However, a fundamental problem exists, particularly with hypergolic fuels, when the injection into the chamber is concentrated at the center of the combustor. This problem with hypergolic fuel combustion is the degree of hydraulic mixing which determines both the fuel distribution and the heat available for vaporization. This mixing becomes increasingly limited as the injector element size is increased. As larger streams or solid sheets of very reactive oxidizer and fuel impinge on each other, prior art engines and combustors experienced only limited liquid mixing before gas and vapor generated at the interface is present in sufficient quantity to partially separate the oxidizer and fuel streams. The result of this is that a certain percentage of the total fuel is deflected apart and remains unmixed, and any further mixing must occur downstream in the combustion chamber either by the relatively slow processes of diffusion or recirculation. This results in decreased combustion efficiency in the engine or combustor. In addition to the problem of not obtaining sufficient mixing with larger element sizes, the concentration of the fuel into relatively unmixed pockets can cause high amplitude local pressure fluctuations if they reach explosion limits. These fluctuations may become quite severe in the fuel-rich regions of the chamber, and in some cases large enough pressure spikes to be destructive of the combustor walls can occur. In addition, these disturbances form the main source of triggers for combustion instability in the chamber.

In prior art structures, the problem of combustion instability has been resolved in some cases by accepting the possibility of the phenomena and statistically assuming that a certain percent of the engines or combustors will fail. Another way of solving this problem has been to provide baffles on the injector face or other types of acoustic energy absorbing devices in the combustion chamber to decrease the tangential or transverse and radial modes of pressure fluctuations. However, with these methods, for each change in combustor size, much design and testing work is necessary to provide the proper baffle or absorber configuration and also to establish the other injector design parameters to provide a matched system. An example of this baffle construction is seen in the U.S. Patent to Mower et al, U.S. Pat. No. 3,200,589.

SUMMARY OF THE INVENTION

This invention obviates the problems and complexities of prior art structures by providing a single, centrally located coaxial injector with one reactant impinging on the other in an annular stream. The other reactant is introduced through geometrically staggered orifices having several different areas to provide penetration and interlocking of the oxidizer and fuel in the impingement zone prior to the occurrence of significant liquid and/or vapor phase reactions.

DESCRIPTION OF THE PREFERRED EMBODIMENTS

Figure 1:
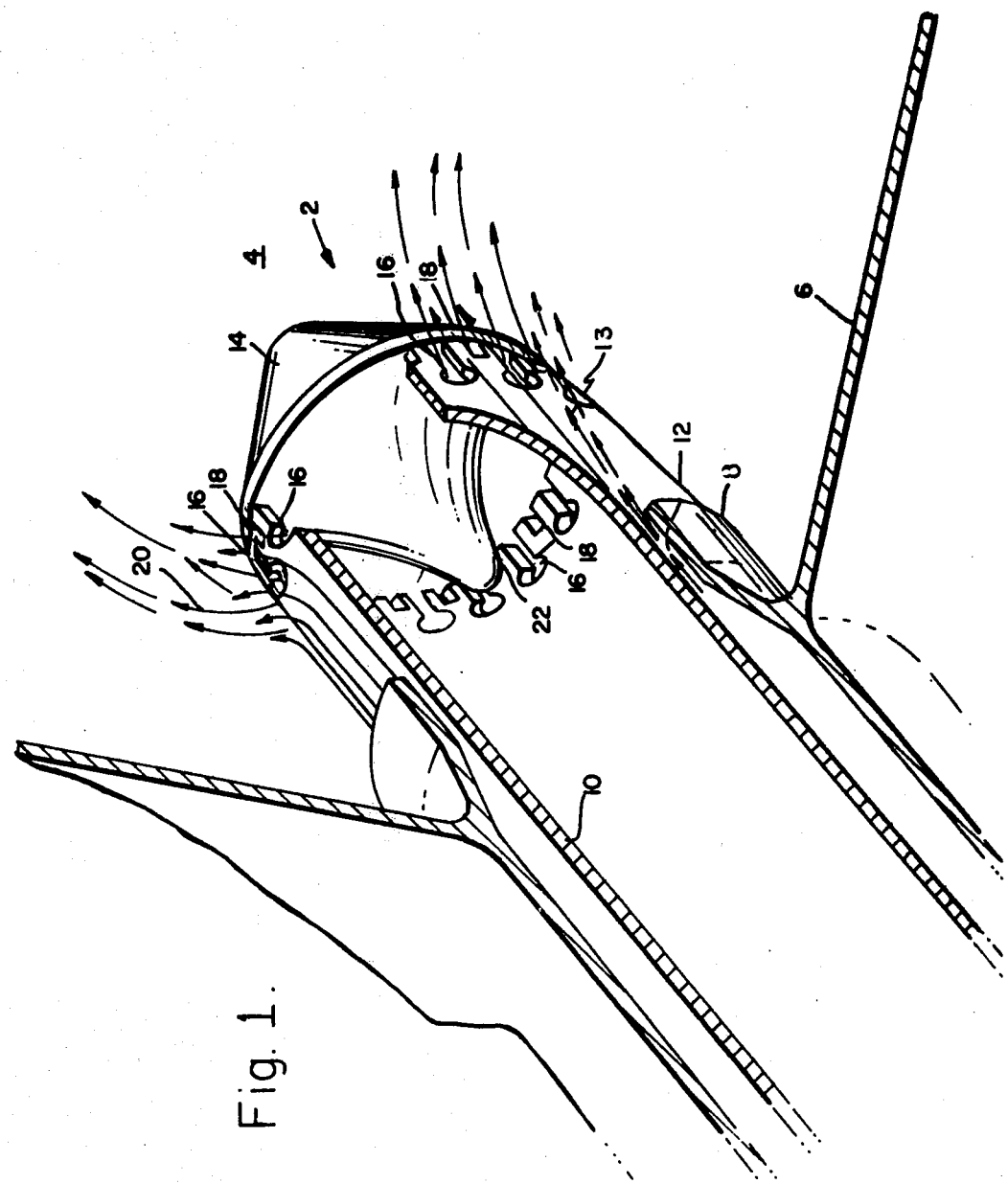
FIG. 1 is a perspective view, partially in cross section, of a coaxial injector according to this invention.
Figure 2:
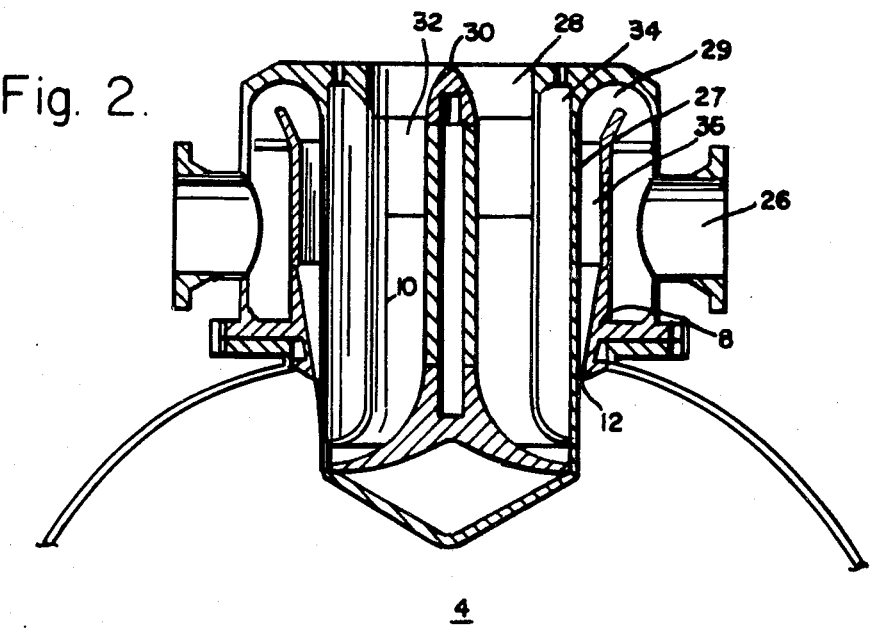
FIG. 2 is a view in cross section of an injector according to this invention.
Figure 3:
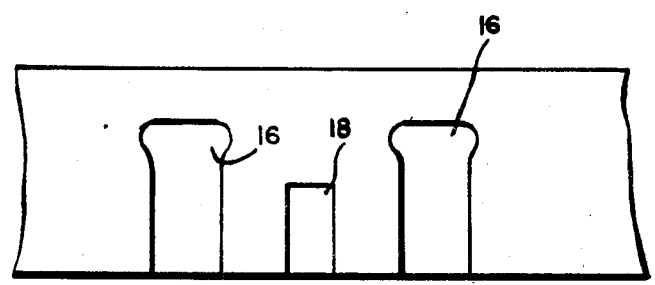
FIG. 3 illustrates the arrangement of slots in the pintle for introduction of one of the reactants.

Referring to FIG. 1, an injector constructed according to this invention is shown partially in cross section. The coaxial injector is shown generally at 2 and extends into the combustion chamber 4 which is formed or enclosed by combustion chamber wall 6. An outer annular sleeve 8 forms with hollow pintle 10 an annular orifice or slot 12 for introduction of a first reactant such as fuel in the direction of arrows 13. A closure or cap member 14 is attached to or integral with pintle 10. A first series of slots 16 alternate with a plurality of smaller slots 18 to allow a second reactant such as oxidizer introduced to the interior of pintle 10 to exit in a radial direction as shown by arrows 20, to penetrate, interlock and hydraulically mix with the reactant from annular orifice or slot 12. A cone shaped projection 22 diverts the reactant toward slots 16 and 18. In FIG. 2, the fuel ducts 26 are shown as illustrating one manner in which the first reactant is supplied to orifice or slot 12 through orifices 27 and manifold 29. The second reactant enters at 28. A central member 30 is shown with supporting vanes 32 and 34 to provide support for the pintle tip. In a similar manner, vanes 35 are provided to properly space pintle 10 from sleeve 8. FIG. 3 is illustrative of the slots 16 and 18. In this connection, while slots 16 are shown as resembling a keyhole, it is within this invention's scope to provide rectangular or other shaped slots. Similarly, the shape of slots 18 can be varied.

It has been found by Applicant that the area of slots 16 relative to slots 18 are selected based on the reactant flow rate to pintle diameter ratio. The optimum range for the percentage of reactant which should flow through openings 16 lies between 5 and 50 percent. In addition, the unit spacing between the slots 18 is such as to be directly proportional to the thickness of the reactant sheet exiting orifice 12 such that radial and circumferential hydraulic interlocking of the two propellants is proportionately the same at all engine sizes.

In operation, a first reactant such as fuel is injected through orifice 12 in a substantially axial direction. A second reactant such as oxidizer exits in a radial direction through the staggered slots 16 and 18 to interlock and impinge with the first reactant. By providing the small slot 18 between the main slots 16, an increase in efficiency is provided by additional mixing and contact of the reactants which have been caused to bypass the larger slots. This hydraulic interlocking prior to reaction permits all of the reactants to be introduced at the center portion of the combustion chamber without attendant loss in combustion efficiency even in very large engines.

By this described configuration using a coaxial injection with the slot arrangement as shown and described, it has been found that regardless of combustor or engine size the problem of combustion instability no longer exists.

The damaging tangential modes of combustion instability which may be initiated by a disturbance in the combustion chamber or feed system is immediately dynamically damped by this central injection method. In addition, the first radial mode of instability is also effectively damped by this configuration.

Having described this invention, it is understood that it is to be limited only by the scope of the claims appended hereto.

I claim:

1. In a combustion apparatus comprising a combustion chamber and an injector assembly for introducing first and second reactants into said chamber, said injector assembly comprising:
   an annular member,
   a substantially hollow pintle positioned coaxially within said member and defining between said member and said pintle an annular space for introduction of said first reactant,
   said pintle extending into said combustion chamber beyond the inner end of said annular member and having:
   (a) a closure member at its inner end,
   (b) a plurality of first apertures and a plurality of second apertures circumferentially spaced around said pintle and through which the second reactant flows outwardly from the follow interior of said pintle in a manner to impinge and mix with said first reactant, with the upstream edge of each first aperture being further from the end of said pintle than the upstream edge of any second aperture and with the second apertures being substantially smaller than the first apertures.

2. An injector assembly in accordance with claim 1 in which the ratio of the cross-sectional area of each second aperture to that of each first aperture is within the range of 5 to 50 percent.

3. An apparatus in accordance with claim 1 in which a fuel is injected through the annular orifice and an oxidizer is injected through said first and second apertures to interlock with and mix with said fuel.

* * * * *